(12) United States Patent
Larat et al.

(10) Patent No.: US 9,599,763 B2
(45) Date of Patent: Mar. 21, 2017

(54) UNIVERSAL TRAFFIC LIGHT LUMINAIRE

(71) Applicant: Thales Deutschland GmbH, Ditzingen (DE)

(72) Inventors: Christian Larat, Paris (FR); Alfred Warmuth, Cleebronn (DE); Horst Joestingmeier, Kornwestheim (DE); Romain Czarny, Chatillon (FR); Brigitte Loiseaux, Bures (FR); Jean-Paul Castera, Chevreuse (FR)

(73) Assignee: Thales Deutschland GmbH, Ditzingen (DE)

( * ) Notice: Subject to any disclaimer, the term of this patent is extended or adjusted under 35 U.S.C. 154(b) by 183 days.

(21) Appl. No.: 14/658,155

(22) Filed: Mar. 14, 2015

(65) Prior Publication Data

US 2015/0185389 A1 Jul. 2, 2015

Related U.S. Application Data

(63) Continuation of application No. PCT/EP2013/068958, filed on Sep. 12, 2013.

(30) Foreign Application Priority Data

Sep. 14, 2012 (EP) .................... 12184456

(51) Int. Cl.
*F21V 8/00* (2006.01)
*F21V 5/04* (2006.01)
(Continued)

(52) U.S. Cl.
CPC .............. *G02B 6/0006* (2013.01); *F21V 5/04* (2013.01); *F21V 9/04* (2013.01); *F21Y 2101/00* (2013.01); *F21Y 2115/30* (2016.08)

(58) Field of Classification Search
CPC ..................................... F21V 9/09; F21V 5/04
See application file for complete search history.

(56) References Cited

U.S. PATENT DOCUMENTS

| 7,033,736 B2 | 4/2006 | Morris et al. |
| 2002/0196639 A1 | 12/2002 | Weidel |

(Continued)

FOREIGN PATENT DOCUMENTS

| DE | 10 2004 007211 A1 | 9/2005 |
| DE | 10 2009 047882 A1 | 3/2011 |

(Continued)

*Primary Examiner* — David V Bruce
(74) *Attorney, Agent, or Firm* — Hackler Daghighian Martino & Novak (57) ABSTRACT

A traffic light luminaire includes at least one light source, a collimating device for collimating light emitted by the at least one light source, and a light distribution device for spreading the collimated light within a specific solid angle with a specific luminous intensity distribution. The light source is a high brightness light source, and the light distribution device is a microstructured distributor having a micro-structured surface, wherein each equal-sized macroscopic section of the microstructured distributor contributes to the luminous intensity distribution in the same way within said whole specified solid angle. Thereby a low maintenance traffic light luminaire is provided which generates a homogeneous light distribution for a variety of trail arrangements (right curve, left curve, straight line) independent of the distance of the viewer.

19 Claims, 5 Drawing Sheets

(51) Int. Cl.
*F21V 9/04* (2006.01)
*F21Y 101/00* (2016.01)

(56) References Cited

U.S. PATENT DOCUMENTS

2003/0076237 A1 4/2003 Blumel
2008/0266665 A1 10/2008 Sasian-Alvarado

FOREIGN PATENT DOCUMENTS

| EP | 1 577 863 A2 | 9/2005 | |
|---|---|---|---|
| EP | 2 431 252 A2 | 3/2012 | |
| EP | 2431252 A2 * | 3/2012 | ............ B61L 5/1827 |
| KR | 2008 0105469 A | 12/2008 | |
| WO | 2011 039005 A1 | 4/2011 | |

* cited by examiner

UNIVERSAL TRAFFIC LIGHT LUMINAIRE

CROSS-REFERENCE TO RELATED APPLICATIONS

This continuation application claims priority to PCT/EP2013/068958 filed on Sep. 12, 2013 which has published as WO 2014/041099 A2 and also the European application number 12 184 456.7 filed on Sep. 14, 2012, the contents of which are fully incorporated herein with these references.

FIELD OF THE INVENTION

The invention concerns a traffic light luminaire including at least one light source, a collimating device for collimating light emitted by the at least one light source, and a light distribution device for spreading the collimated light within a specific solid angle with a specific luminous intensity distribution.

BACKGROUND OF THE INVENTION

In special lighting applications, in particular in traffic signalling, the light is to be emitted according to a pattern that corresponds to positions where the user needs to see a signal. To this end the classical architecture which has been used for tens of years includes a single light source (generally a light-bulb) collimated by an optical system (that can be a single lens or a Fresnel lens in some applications). Then a light diffusing distributor that matches the size of the output beam is inserted at the output area to spread the light in the required directions.

This distributor can be realized by some divergent lenses if the pattern is smooth and simple, or—when fine shaping is needed—with several refractive elements or a diffusive surface. The distributor is divided in different zones, each zone deflecting the light in a specific direction. The power balance between each angular sector is obtained by a surface repartition between the diffuser zones.

A drawback of this configuration is that for each situation (right curve, left curve, strait part . . . ) a specific distributor needs to be designed and used. This results in a large number of configurations to be anticipated and managed. Moreover, if different signal diameters are needed, each distributor must be recalculated and re-adapted to the new beam diameter. A further disadvantage of the above described configuration is that due to the zone division of the refractive distributor and depending on the angular position of the viewer, only a part of the surface of the distributor seems to be luminous, which leads to an inhomogeneous and sometimes non-circular light distribution on the signal surface. This effect is particularly visible when getting close to the signal, i.e. when the user is close enough to be able to distinguish the different zones of the distributor. Moreover, the lifetime and the power efficiency of light bulbs are quite poor and lead to high maintenance costs.

More recently, to overcome the maintenance limitation of light bulb based device, a luminaire using multiple source based on LED (Light Emitting Diode) have been used. However, when safety is necessary (which is the case for railway applications), each source must contribute to the whole distribution pattern, i.e. the light of each source has to be spread to the same relative light intensity distribution, so that a source failure does not lead to a variation in the relative light distribution. This means that in order to spread the light in different directions, each collimated source must be equipped with an individual distributor that provides the desired light distribution (THALES "FieldTrac 6365 LELD-Signal"). By using this configuration, there is no need to redesign the light distributors if the size of the signal is to be adapted: the surface variation can be compensated by adding or removing collimated (and distributed) light sources. However, by doing so, the electrical design of the signal can change significantly which also has an impact on the optical output flux of the luminaire, both limiting the scalability of this architecture.

Compared to a light bulb the LED active surface is rather large, meaning that individual collimation of each LED will lead to a more diverging beam. In other words LEDs suffer from low brightness requiring the use of tens of LED, thus leading to more complex and costly architectures. Additionally, because of the small size of the distributors, it is more difficult to shape a sharp angular distribution.

Due to the described limitations, the light distribution of this kind of signal is far less efficient than the one achievable with single light sources. This means that here again, the light distribution must be optimized for each specific situation (right curve, left curve, strait part . . . ), meaning that specific distributors are to be designed and used in order to save available optical output flux of the luminaire.

It is an object of the invention to provide a low maintenance traffic light luminaire which generates a homogeneous light distribution for a variety of trail arrangements (right curve, left curve, straight line) independent of the distance of the viewer.

SUMMARY OF THE INVENTION

According to the invention the light source is a high brightness light source, and the light distribution device is a microstructured distributor having a microstructured surface, whereby any arbitrary macroscopic section of the microstructured surface contributes to the luminous intensity distribution in the whole specific solid angle.

Structured distributors are known from display (LCD) and diffuse illumination applications (U.S. Pat. No. 7,033,736 B2). Such microstructured distributors comprise a substrate and a plurality of microstructures distributed over the surface of said substrate. The microstructured distributor is a refractive-based diffuser that allows quasi-arbitrary beam shaping operations in terms of diffusing angles and energy spreading under broadband illumination (illumination with light within the whole visible range). The micro-structures are preferably organized in arrays on a surface. The surface appearance of a microstructured distributor might look random. However, the relative distribution (size, shapes and relative location) of the microstructures across the surface includes specific shapes with some parametric randomly-distributed features to avoid visual artefacts caused by periodic arrays. The used microstructures may comprise curved micro-lens portions and straight-sided piston portions. The shapes of the microstructures are used to control the shape of the light scattering profile (luminous intensity distribution). By using the Fourier Optics diffraction laws one can compute the required microstructure shapes and distribution on the distributor's surface to achieve the specific luminous intensity distribution (desired scattering pattern). For visible range applications, microstructured distributors with a surface corrugation structure size up to a few hundred microns and a typical depth of 10 μm and with accuracy on the order of a few microns down to a sub-micron level are known.

The micro-elements (microstructures) on the surface of the microstructured distributor act collectively to generate a desired scattering as described in U.S. Pat. No. 7,033,736 B2. In contrast to zoned distributors, where each zone contributes to the luminous intensity distribution in only a part of the specified solid angle (partial solid angle), the whole surface of the microstructured distributor (i.e. each macroscopic section) contributes to the luminous intensity distribution in the whole solid angle. In other words the distributor can be partitioned into arbitrary macroscopic sections, each macroscopic sections spreading light within the whole specific solid angle, more precisely all macroscopic parts (of the same size) of the microstructured distributor contribute to the luminous intensity distribution in the same way within said whole specified solid angle. The distributor is not divided into different zones. Thus by using a structures distributor the viewer sees a luminous distributor surface with a homogeneous appearance from a colorimetric and an intensity point of even in the near field, i.e. in a distance smaller than 10 m.

A high brightness light source according to the invention is a light source with a luminance of at least $0.1$ cd/mm$^2$. For day-time railway application according to a German universal distribution pattern a luminance of at least $0.8$ cd/mm$^2$ is preferred. The preferred luminance can be different for other applications, e.g. for night-time operation. Highly preferred is a luminance of at least 10 cd/mm$^2$. The choice of a higher brightness allows easier collection, shaping and mixing (see below). No passive component is required in order to increase the brightness of the source. For the choice of the brightness of the light source degradation due to different optical elements should be considered in order to remain compatible with the requirements for the application.

The high brightness light source allows the usage of a small light source thereby ensuring that the divergence of the emitted light is low. The light source should be well collimated in order to achieve a high light yield of the emitted photons at the distributor's surface. Thus a maximum number of photons reach the distributor and contribute to the desired luminous intensity distribution.

By using a high brightness light source the beams are incident on the distributor with a similar incident angle, thereby allowing an improved light control. The combination of the microstructured distributor with a high brightness light source results in a sharp angular luminous intensity distribution. In other words a luminous intensity distributions can be realized which shows high intensity changes within a small angular sector. This enables illumination of a small angular sector of the specified solid angle with a high intensity (for example 500 cd in a solid angle of $\sim 10^{-2}$ sr), while ensuring a homogeneous appearance of the luminous distributor surface.

The exact value of the required brightness of the light source depends on the desired intensity and resolution of the specified luminous intensity distribution (the higher the desired resolution the higher the required brightness of the light sources). The flux of the light source(s) (in the following designated as "source flux") should be compatible with the desired total intensity of the specified luminous intensity distribution.

By providing different shaped microstructures on the surface of the distributor the light can be spread in different directions, thereby producing luminous intensity distributions in different specific directions (solid angles) or in an (compared to the solid angle realized by zoned distributors) enlarged solid angle, up to 0.7 sr. Thus, only one single distributor is required for visualizing a signal in a right curve, left curve and at a straight part. In other words the same distributor can be used for spreading the light in several directions (in an enlarged solid angle) in a sharp angular distribution to cover the full range of standard railway applications.

With the inventive luminaire the light is distributed more efficiently and therefore the same optical output flux can be used on a broader solid angle.

The distributor is designed to match the diameter of the luminaire and to spread the light in a specific angular luminous intensity distribution, i.e. within the specific solid angle with a specific intensity. The size of the output beam of the luminaire can be adapted without redesigning the distributor. It is sufficient to adjust the collimating optics and the size of the distributor. No modification on the structure of the distributor has to be made, because at a millimeter scale, each part of the diffuser is contributing to the whole luminous intensity distribution.

In an exemplary embodiment the light source is a semiconductor light source, in particular a laser diode or a high brightness LED. Typical values for the brightness of a commercial high brightness LEDs lie between 10 and 40 cd/mm$^2$, for a solid state laser source $\sim 10^8$ cd/mm$^2$, which allows higher optical efficiency for beam transport and shaping. The usage of other sources, e.g. Diode-Pumped Solid-state Laser (DPSS), Vertical-Cavity Surface-Emitting Laser (VCSEL), Vertical External-Cavity Surface-Emitting Laser (VECSEL), Organic Light-Emitting Diode (OLED), Polymer Light-Emitting Diodes (PLED), Quantum Dot LED (QDLED), is also possible.

The size of the light source is preferably equal or smaller than $2f \tan \delta$, with $f$ being the focal distance of the collimating device and $2\delta$ being the smallest angular sector within which the intensity of the specified luminous intensity distribution is constant (=distribution diagram resolution). In other words in order to maximizing the efficiency of the inventive luminaire the beam divergence complies with the smallest feature to be resolved in the distribution diagram (intensity vs. angle), whereby a "feature" in the distribution diagram means a change of intensity within a specified solid angle. The "size of the light source" is the diameter/length/height of the active surface of the light source or of the output area of the homogenizing device (see below).

In a highly exemplary embodiment at least two light sources are provided, in particular light sources of at least two different types, each type emitting light of a different color. Light sources of the same type are advantageously provided for redundancy reasons. By providing light sources of different color, color mixing can be carried out in order to provide light of a specified color, which is not available with a commercially available solid state light source. In a special embodiment only one high brightness light source for each color is provided. Yet, for redundancy purposes more than one light source of each type is preferred.

In order to ensure a homogenous appearance of the signal produced by the traffic light luminaire with several light sources, it may be preferred to provide an elongated light homogenizing device for spatial superposition of the light emitted by the different light sources prior to entering the collimating optical system, the light homogenizing device comprising an optical waveguide with an input area for coupling the light emitted by the light sources into the waveguide and an output area for coupling a beam of superimposed light out of the waveguide.

The light homogenizing device is positioned within an optical path between the light sources and the collimating device. Preferably the output area faces the collimating device. Alternatively mirrors or other optical elements can be used to guide the superimposed light from the light homogenizing device to the collimating device.

The input area and the output area are connected by a lateral area. The light coupled into the waveguide is reflected at the inner surfaces of the lateral area. Since the light emitted by each light source is divergent, the light enters the waveguide under different angles and according to this, the light is reflected under different angles. Thus the light of each light source is spread over the whole output area of the waveguide thereby causing spatial superposition of the light of the different light sources, thereby forming a homogenised beam. At the output area of the waveguide the light of all light sources is mixed up (homogenised), i.e. the single light sources cannot be distinguished from one another anymore, thereby giving an impression of one single light source.

The light homogenizing device can further comprise a diffuser. The diffuser can be realized by providing a roughened surface of the output area. The usage of a diffuser ensures a satisfying homogeneity of the superposed light of different light sources even in the near field. The diffuser can be omitted if the waveguide of the homogenizing device cannot propagate images, i.e. if the inner surfaces of the waveguide are not plane. In particular the diffuser can be omitted if a long optical fiber is used as homogenizing device. The required length of the fiber depends on the divergence of the source and the size of the waveguide (10 cm up to several meters).

Although several light sources are used, which are separated from each other, a homogenous luminous intensity distribution can be realized, even in the near field. Thus a homogeneous signal can be seen from different distances and angles, e.g. if a traffic light is positioned within a curve and a vehicle or person gets closer to the traffic light. The intensity of the signal may vary in dependence of the viewing angle.

In order to ensure a high degree of homogenization, in particular if light sources of different colors are used, the shape of the waveguide is configured such that the light coupled into the waveguide is reflected within the waveguide a minimum number of times, in particular at least 2 times. In other words the length of the optical waveguide element has to be chosen long enough to ensure a minimum number of reflections, wherein the required length of the waveguide depends on the divergence of the received light (the higher the divergence the smaller the required length) and the cross section of the waveguide (the smaller the cross-section the smaller the required length). The larger the number of reflections, the better is the homogeneity of the light at the output area (but the larger the losses). The minimum number of reflexions shall apply for the most divergent rays of the (even though small) divergent beam coupled into the waveguide.

When using a homogenizing device the size of the output area is considered as the "source" of the light from a collimating point of view. Thus the size of the output area influences the divergence of the collimated beam. For optimum optical efficiency, the size of the output area of the homogenizing device should be smaller or equal to 2f tan δ.

The output area of the waveguide is preferably positioned within or near the focal plane of the collimating device. Most preferred the output area of the waveguide is positioned within the focal plane (plane perpendicular to the optical axis a which passes through the focal point) and comprises the focal point. But the invention also works if the output area is near enough to the focal point, so that the beam divergence after collimation remains compatible with the smallest angle, in which the desired light distribution is constant.

It is advantageous if the waveguide has a small output area for concentrating the light of the different light sources to a small area (simulating a point source). Therefore in an exemplary embodiment the waveguide is an optical fiber, wherein the input area is an end face at a first tail end of the fiber and the output area is an end face at a second tail end of the optical fiber.

Optical fibers are commercially available in a large variety of length which ensures a sufficient number of reflections and thereby high degree of homogeneity of the light at the output area of the fiber. However, it is also possible to use other bulk or hollow waveguides, such as an elongated prismatic waveguide, a block-shaped plate or a tapered waveguide (cone shaped, wedged) or a reflecting conduit (light tube). In the latter case the input area and the output area are apertures.

In a special embodiment an optical supervision system is provided for controlling the intensity level of the light emitted by the light sources, the supervision system comprising at least one light detector, in particular a photo diode, the at least one light detector being arranged for detecting light at least at one specific location within the optical system, in particular being arranged for detecting light exiting the light homogenizing device or the light distribution device, and the control device being adapted to maintain a predetermined luminous intensity and color of the detected light.

The emitted light is preferably detected close to the output area of the homogenizing device, but it is also possible to detect the light at the light sources, or elsewhere within the luminaire, e.g. at the light distribution device. The light detector is preferably placed in separate supervision housing. Preferably the light is guided to the light detector by optical fibers. For example back scattered light from the distributor can be collected by optical fibers side connected to the microstructured distributor or placed close to the distributor. The data of the detected light is fed to the control device which switches the luminous intensity of the light sources to or keeps it at a specific intensity level.

Preferably the light sources are placed within a source housing, and the collimating device and the microstructured distributor are placed in an optical head housing, wherein the source housing and the optical housing are separated from each other and optically connected via an optical fiber. The connecting optical fiber can be the optical fiber of the light homogenizing device. By using the different housings for the solid state light sources on the one hand and collimating device and the microstructured distributor on the other hand, a purely optical part (no active components) of the system can be spatially separated from the light generating components. Since optical fibers have low losses the two housings can be located distantly up to 100 m and more. The length of the fibers are only limited by the losses in the fiber (>85% transmission for 25 m fiber). The output flux and the brightness of the sources have to be adapted in order to compensate for those losses.

Therefore, it is possible to arrange the optical housing mounted on the head of a railway traffic light signal while the source housing is located at the ground, away from the traffic light signal, to provide easy access for maintenance and a more suitable thermal environment.

In an advantageous embodiment an IR absorbing element is provided, and an IR light source is provided for irradiating the IR absorbing element with IR-radiation. Thereby ice and/or condensation formation can be prevented. An element is defined as an IR absorbing element if it absorbs more than 90%, preferable more than 99.9% of the IR radiation emitted by the IR source. The IR light source is preferably placed within the electronic housing. The emitted IR light can be treated (mixed, collimated) together with the visible light of the other light sources. In this case the optical elements (homogenizing device, collimation device, distributor) should be transparent to the IR wavelength. The IR-absorbing element is preferably an IR absorbing window at an output side of the optical head housing at which light distributed by the microstructured distributor leaves the optical head housing. In this case the IR absorbing element must be transparent for the wave lengths emitted by the other light sources.

The present invention also concerns the use of a microstructured distributor in a traffic light luminaire for railway signal applications, the microstructured distributor having a microstructured surface, whereby any arbitrary macroscopic section of the microstructured surface contributes to the luminous intensity distribution in the whole specific angle.

The microstructured distributors known from the state of the art are used as illumination devices or diffusing screens without a visual interaction with a moving person, whereas the present invention concerns traffic light applications, in particular railway signals, the light of which is viewed directly from different distances and different viewing angles. It has been discovered that a microstructured optical distributor has the potential to spread light in a sharp angular luminous intensity distribution, when combined with a well collimated high brightness light source. This sharp angular luminous intensity distribution enables the usage of a microstructured distributor for traffic light luminaires with a luminous intensity distribution in an enlarged solid angle. Thus the luminous intensity distribution can be viewed at a variety of positions. A typical total illuminated region for a railway traffic luminaire lies within a square cone of +1.0°-30° vertical and −40+40° horizontal, corresponding to a solid angle of ~0.7 sr.

The inventive luminaire can be used for any traffic control, e.g. for streets, railways, airports, taxiways.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is shown in the drawings and will be explained in detail using exemplary embodiments. In the drawings.

DETAILED DESCRIPTION OF THE PREFERRED EMBODIMENTS

Figure 1A:
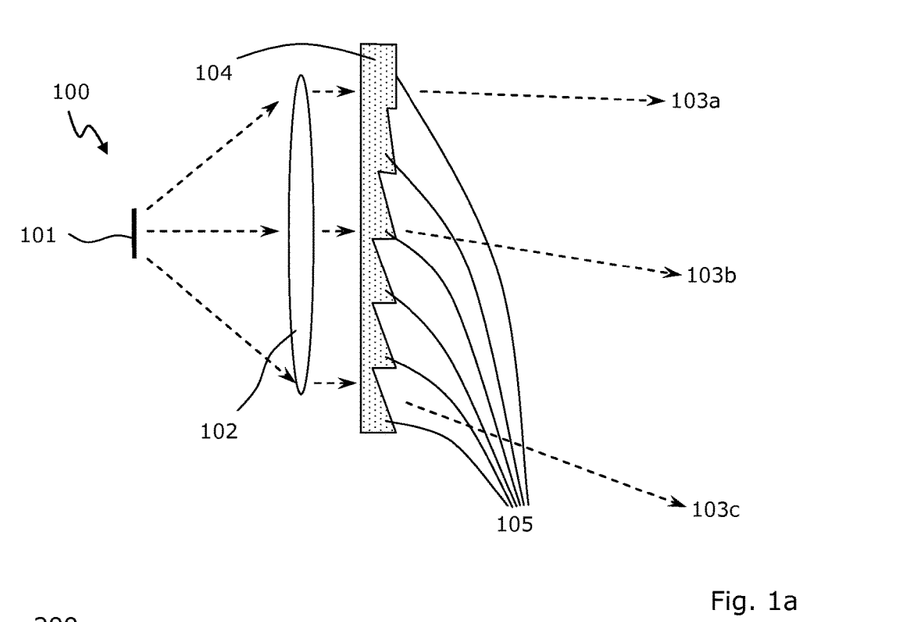
FIG. 1a shows a schematic illustration of a luminaire with one light source and a zoned distributor according to the state of the art.
Figure 1B:
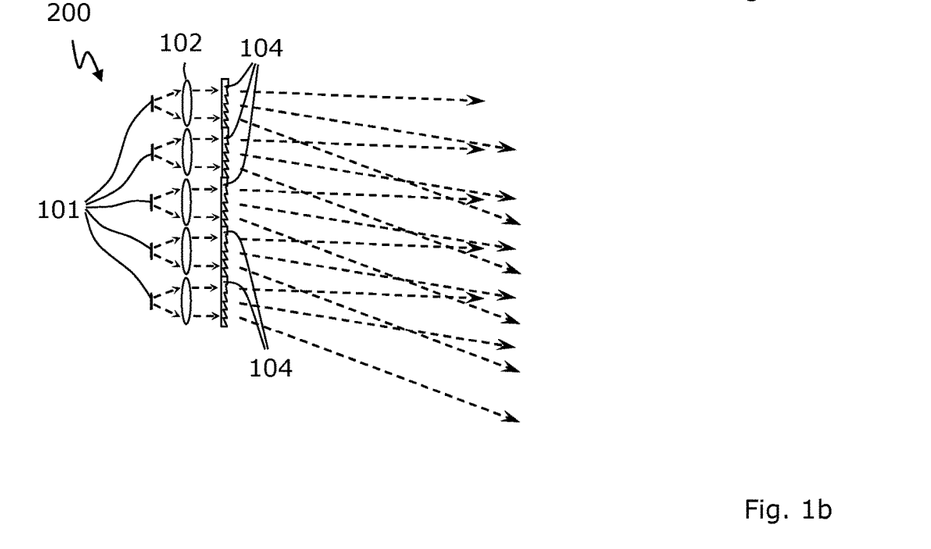
FIG. 1b shows a schematic illustration of a luminaire with multiple light sources and zoned distributors according to the state of the art.

FIG. 1a, 1b show luminaires 100, 200 with one light source 101 (FIG. 1a) and multiple light sources (FIG. 1 b) respectively. The light of each light source 101 is collimated by a collimation lens 102 and spread in different directions 103a, 103b, 103c by a zoned distributor 104 according to the state of the art. The zoned distributor 104 is divided in different zones 105, each zone 102 deflecting the collimated light in one of the different directions 103a, 103b, 103c (in FIGS. 1a, 1b exemplarily shown for three zones). In order to ensure that each light source 103 contributes to the whole luminous intensity distribution pattern, each collimated source is provided with its own zoned distributor 104.

Figure 2:
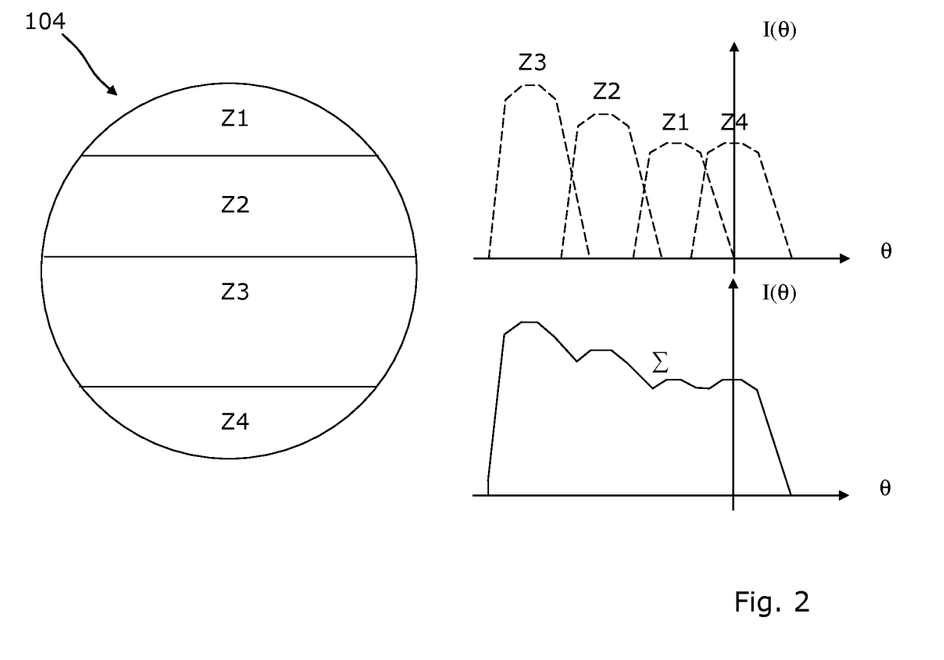
FIG. 2 shows a schematic front view of a zoned distributor according to the state of the art and the corresponding luminous intensity distribution pattern.

FIG. 2 shows a zoned distributor 104 with four zones Z1, Z2, Z3, Z4. Each zone Z1, Z2, Z3, Z4 spreading the light within an angular sector (partial solid angle) which is smaller than the solid angle of the whole luminous intensity distribution of the luminaire 100, 200, as shown in FIG. 2 (top diagram). The angular sector of neighbouring zones Z1/Z2, Z2/Z3, Z3/Z4 overlap. The total luminous intensity distribution (sum of the contributions of each zone Z1, Z2, Z3, Z4) is shown in the bottom diagram of FIG. 2.

Figure 3:
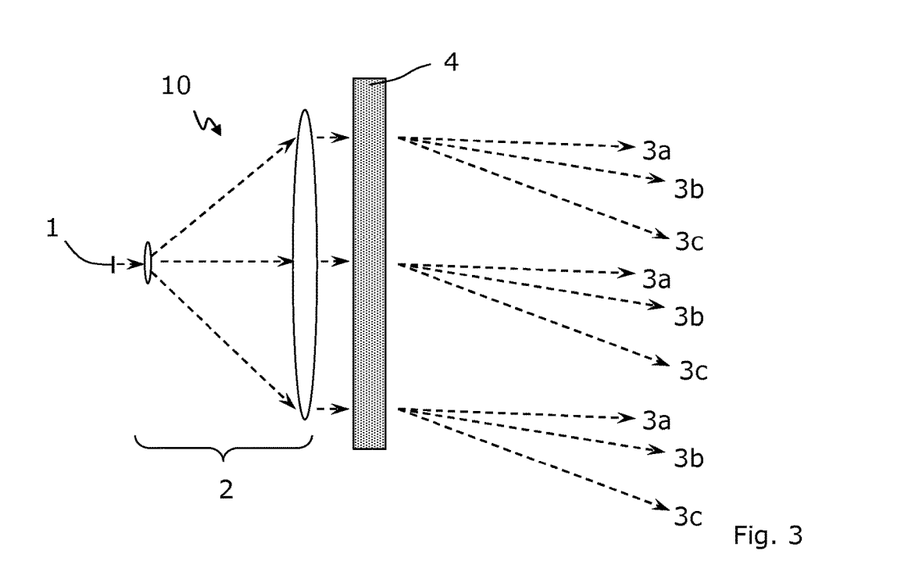
FIG. 3 shows a schematic illustration of a basic embodiment of a luminaire according to the invention with one high brightness light source and a microstructured distributor.

FIG. 3 shows a basic embodiment of an inventive luminaire 10. A high brightness light source 1 emits light which is collimated by a collimating device 2 and spread in different directions 3a, 3b, 3c by a microstructured distributor 4. The microstructured distributor 4 has a microstructured surface and does not show different zones. In contrast to the zoned distributor 104, shown in FIGS. 1a, 1b and 2, each arbitrary macroscopic section of the microstructured distributor 4 contributes to the whole luminous intensity distribution in the same way (provided that the sections are of the same size and are illuminated by the collimated source with the same intensity).

Figure 4:
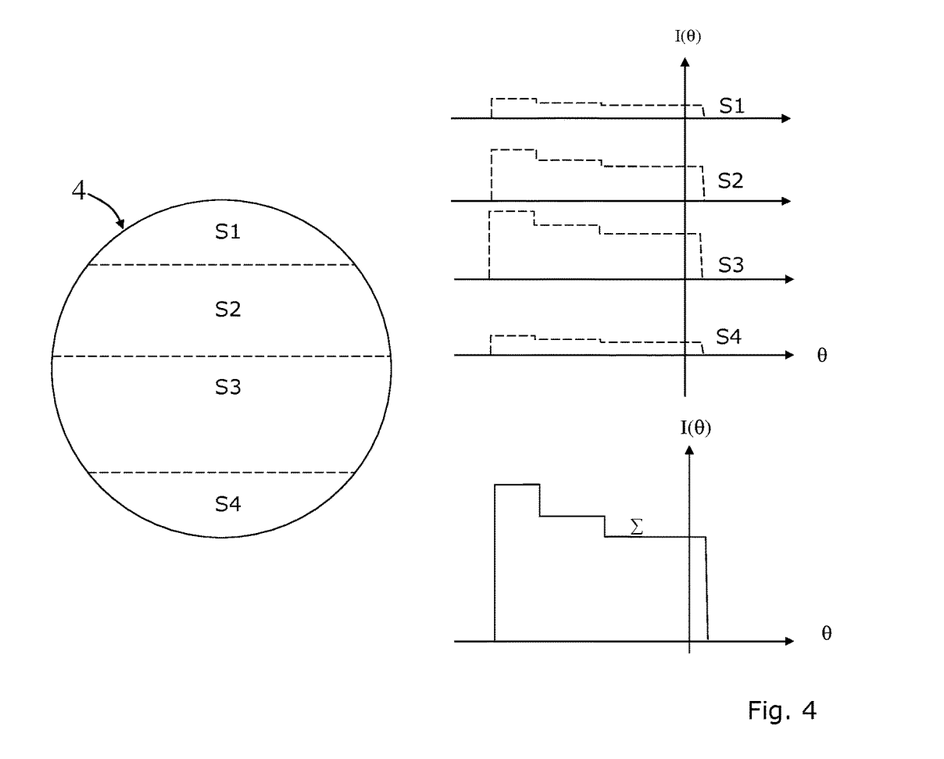
FIG. 4 shows a schematic front view of the microstructured distributor of FIG. 3 and the corresponding luminous intensity distribution pattern associated with the luminaire of FIG. 3.

For comparison reasons the microstructured distributor 4 has been virtually divided into four (different sized) "virtual" macroscopic section S1, S2, S3, S4 (see FIG. 4), which correspond in size to the different zones Z1, Z2, Z3, Z4 of the microstructured distributor 104 shown in FIG. 2 The single contributions of the "virtual" macroscopic section S1, S2, S3, S4 are shown in the top diagram of FIG. 4. It can be seen that the relative luminous intensity distribution within the same solid angle is the same for all macroscopic sections S1, S2, S3, S4, whereby the luminous intensity distribution of the different macroscopic sections S1, S2, S3, S4 vary in dependence of the size the sections S1, S2, S3, S4 (assuming a uniform lighting of the distributor after collimation which might not be exactly the case for a practical case). Compared to a zoned distributor the full surface of the microstructured distributor is contributing to the totality of the scattering pattern, thereby allowing scaling the diameter of the luminaire 10 without redesigning the distributor. Moreover, the usage of the microstructured distributor in combination with a high brightness light source allows the realization of a sharp angular luminous intensity distribution pattern, leading to an efficient distribution.

The combination of the high brightness light source and the microstructured distributor results in a sharp luminous intensity distribution, as shown in the bottom diagram of FIG. 4, whereas the luminaires 100, 200 with zoned distributor show a rather smooth luminous intensity distribution, as shown in the bottom diagram of FIG. 2.

For comparison reasons the luminous intensity distribution diagrams of FIGS. 2 and 4 each show a luminous intensity distribution for the same solid angle. Yet, due to the inventive combination of the well-collimated beam of the high brightness light source 1 and of the microstructured distributor 4, high distribution efficiency can be obtained, thereby allowing to spread the light within an enlarged solid angle needed for all encountered track configurations, e.g. in a solid angle of 0.7 rd.

In order to optimize efficiency, the optical components (light sources, collimating device) should be matched with the desired luminous intensity distribution.

Figure 5A:
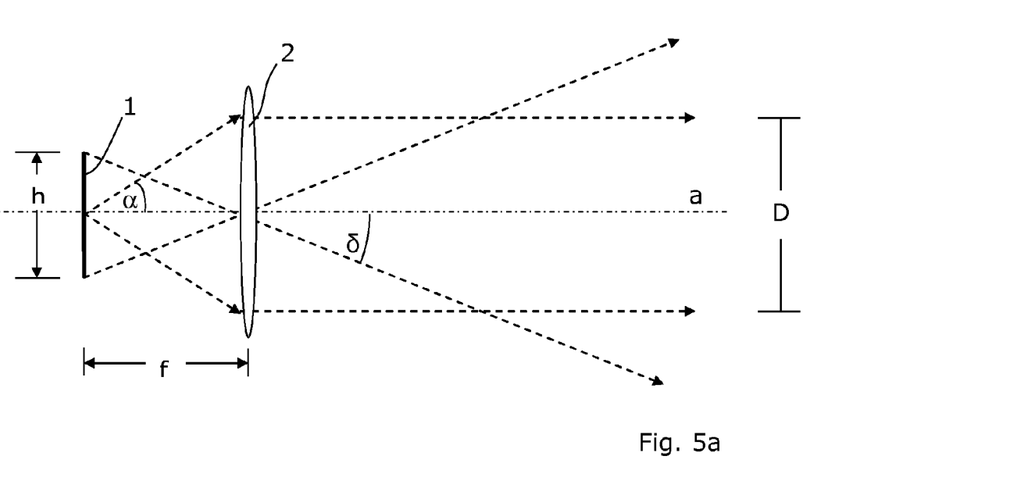
FIG. 5a shows the relationship between the size of the light source and the beam divergence.

FIG. 5a shows the light source 1 with diameter h, the center of which is positioned at the focal point of the collimating device 2. Dependent of the diameter h of the light source 1 the light emitted by the light source 1 is collimated with a divergence δ. The smaller the diameter the smaller is the divergence δ, however, the smaller the diameter the smaller is the source flux φ of the light source of a given brightness. Therefore a trade-off has to be made with respect to the desired intensity and resolution of the specific luminous intensity distribution. For efficient light throughput, the light source 1 advantageously should fulfill the following characteristics:

The source flux φ of the light source 1 is compatible with the total intensity $I_d$ of the specified luminous intensity distribution $(I=\iint I_d(\theta,\phi)d\Omega)$.

Figure 5B:
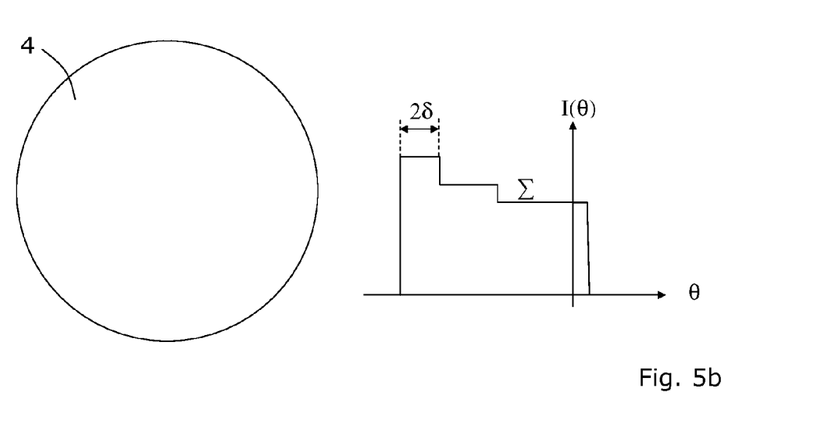
FIG. 5b shows the relationship between the beam divergence and the resolution of the luminous intensity distribution pattern.

The source size h is compatible with the angular resolution δ of the specified luminous intensity distribution (see FIG. 5b)

The source divergence α is compatible with the collimating optic size (diameter D of the collimated beam) and focal length f of a collimation lens.

The precise formulation of these requirements depends on the type of source used at the focal point of the collimating optics. Two exemplary simple cases are illustrated hereafter.

Example 1

A uniform circular light source surface emitting uniformly in a light cone with apex angle 2α (multi-mode fiber output for example):

Constrain on the source flux φ (in [lm]):

$\eta_c \phi > \iint I_d(\theta_x,\phi)d\Omega$ where φ is the source flux, $\eta_c$ the source collection efficiency (ratio of source flux emitted by the light sources and output flux of the luminaire, assumed that there are no losses in the collimating optics and in the distributor), $I_d(\theta, \phi)$ (in [lm/sr]) the required distribution diagram intensity, dΩ the differential far field solid angle, and θ, φ correspond to spherical coordinates.

Constrain on the source divergence:

For maximum collection efficiency ($\eta_c=1$), the source must illuminate the full signal diameter $$\tan\alpha = \frac{D}{2f}$$

where α is the divergence of the light source, D is the signal diameter (which corresponds to the diameter of the collimated beam) and f the focal length of the collimating system.

Constrain on the source size:

$h < 2f \tan\delta$ where 2δ is the distribution diagram resolution (i.e. the smallest angular feature in the distribution), and h is the diameter of the source.

Those constrains can also be expressed relatively to the source brightness L (in [lm/sr/m²]):

$$L = \frac{\phi}{2\pi(1-\cos\alpha)S}$$

where S is the surface area of the active surface of the light source $$\rightarrow L > \frac{2\iint I_d(\theta,\varphi)d\Omega}{\pi^2(1-\cos\alpha)D^2}\left(\frac{\tan\alpha}{\tan\delta}\right)^2$$

For a 136 mm diameter railway light signal unit providing a universal distribution diagram such as described in table 3 (see below) with a maximum far field light intensity of 550 cd and fed by sources coupled in a fiber with a numerical aperture NA=0.48, the following data can be calculated:

$\phi > \iint I_d(\theta,\phi)d\Omega \rightarrow \phi > 15$ lm $\alpha = a\sin(NA) = 28.6° \rightarrow f = 124$ mm $D = 136$ mm $\rightarrow h < 5.4$ mm $\delta = 1.25° \rightarrow L > 0.8$ cd/mm²

Example 2

A uniform square light source surface with a lambertian emission (HP LED for example):

Constrain on the source flux φ (in [lm]):

$\eta_c\phi > \iint I_d(\theta,\phi)d\Omega$ where φ is the source flux, $\eta_c$ the source collection efficiency, $I_d(\theta, \phi)$ (in [lm/sr]) the required distribution diagram intensity, dΩ the differential far field solid angle, and θ, φ correspond to spherical coordinates.

Constrain on the source divergence:

The source been lambertian (i.e. $I_s = I_{max}\cos(\theta)$), the collection efficiency is given by:

$$\eta_c = \frac{\int_0^{2\pi}\int_0^{\alpha} I_s\sin\theta d\theta d\varphi}{\int_0^{2\pi}\int_0^{\pi/2} I_s\sin\theta d\theta d\varphi} = 1-(\cos\alpha)^2$$

with:

$$\tan\alpha = \frac{D}{2f},$$

where D is the signal diameter and f the focal length of the collimating system.

Constrain on the source size:

$$h < 2f \tan\delta$$

where 2δ is the distribution diagram resolution (i.e. the smallest angular feature in the distribution), and h is the diameter of the source.

Those constrains can also be expressed relatively to the source brightness L (in [lm/sr/m²]):

$$L = \frac{I_{max}}{S},$$

where S is the surface area of the active surface of the light source.

$$\int_0^{2\pi}\int_0^\alpha I_s \sin\theta\, d\theta\, d\varphi = \int\int I_d(\theta,\varphi)\, d\Omega$$

$$I_{max} = \frac{\int\int I_d(\theta,\varphi)\, d\Omega}{\pi(1-(\cos\alpha)^2)}$$

$$\to L > \frac{\int\int I_d(\theta,\varphi)\, d\Omega}{\pi(1-(\cos\alpha)^2)D^2}\left(\frac{\tan\alpha}{\tan\delta}\right)^2$$

For a 136 mm diameter railway light signal unit collected by a 94 mm focal lens and providing a universal distribution diagram such as described in table 3 (see below) with a maximum far field light intensity of 550 cd, the following data can be calculated:

$$\alpha = a\tan(D/2f) = 35.9° \to \eta_c = 0.34$$

$$\eta_c \phi > \iint I_d(\theta,\phi) d\Omega \to \phi > 43 \text{ lm}$$

$$f = 94 \text{ mm} \to h < 4.1 \text{ mm}$$

$$\delta = 1.25° \to L > 0.8 \text{ cd/mm}^2$$

Figure 6:
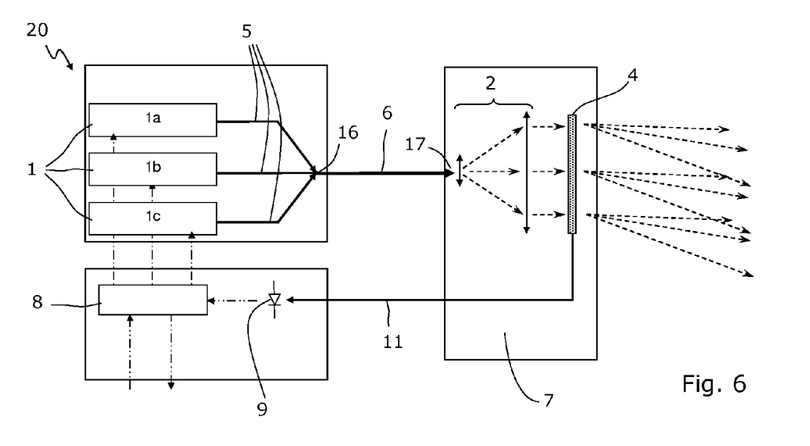
FIG. 6 shows an embodiment of a luminaire according to the invention with redundant light sources and a supervision system.

FIG. 6 shows the configuration of an exemplary embodiment of the inventive luminaire 20 with multiple light sources 1. The luminaire 20 is divided into three parts. The first part comprises the high brightness light sources 1 (preferably laser diode sources) and a collection device for collecting the light of the different light sources 1 and for guiding the light to a homogenizing device. In the embodiment shown in FIG. 6 the collecting device is formed by several optical collecting waveguides 5, in particular optical fibers. Each light source 1 is coupled into an individual optical waveguide 5. The second part comprises the light homogenizing device which connects the collecting device and an optical head 7, the optical head 7 forming the third part of the inventive luminaire 20. The homogenizing device consists of an optical homogenizing waveguide 6 for inter-reflecting light inside the homogenizing waveguide 6 and for guiding the light to the optical head 7.

The collecting waveguides 5 of the collecting device are bundled and coupled into the single homogenizing waveguide 6 of the homogenizing device via an input area 16 of the homogenizing waveguide 6. Light entering through the input area 16 of the homogenizing waveguide 6 is reflected on the inner surfaces of the homogenizing waveguide 6. Due to these reflections the light is homogenized, i.e. the light of the different light sources 1 which are coupled into the homogenizing waveguide 6 at different positions of the input area 16 is mixed and is coupled out of the homogenizing waveguide 6 via an output area 17, whereby the light of each light source 1 is spread over the whole output area 17 of the homogenizing waveguide 6. Thus a high spatial variation in luminous intensity at the input area 16 is converted into a low spatial variation in luminous intensity at the output area 17 of the homogenizing waveguide 6. Thus, at the output area 17 of the light homogenizing waveguide 6, the light originating from the different light sources cannot be assigned to the corresponding light source anymore. Thereby color mixing is enabled, as described below.

The optical head 7 comprises the collimating device 2 and the microstructured distributor 4. The beam exiting the light homogenizing device is expanded and collimated according to the diameter D of the signal to be produced by the traffic light luminaire 20. Thus the shape of the beam, which is incident on the microstructured distributor 4 is determined by the shape of the output area 17 of the homogenizing waveguide 6 and the components of the collimating device 2, whereby the output area 17 of the homogenizing waveguide 6 is considered to be a point source for the collimating device 2.

By gathering more individual high brightness sources 1a-c in the single homogenizing waveguide 6 the optical output flux within the inventive luminaire 20 can be increased. Since the output area 17 of the homogenizing waveguide 6 is considered to be the point source for the collimating device 2 the size of the output area should be compatible with the above described constrains with respect to the light source.

The microstructured distributor 4 spreads the light in a specified luminous intensity distribution according to its microstructured surface. Because of the usage of high brightness sources 1 an improved collimation of the emitted light is provided, which in turn is efficiently distributed in the desired direction by the microstructured distributor 4. Thus the inventive luminaire 20 shows a high efficiency (low light losses). Thanks to this high efficiency, arbitrary sharp and smooth luminous intensity distributions fitting precisely a specified universal distribution diagram within an enlarged solid angle (universal light radiation pattern) can be generated. The appearance of the outer surface of the microstructured distributor 4 is homogeneous at the full size of the signal surface from a colorimetric point of view and from an intensity point of view independent of the position of the user. The size and shape of the signal can be varied by changing the shape of the output area 17 of the homogenizing waveguide 6 and/or the components of the collimating device 2.

To maintain a specified light output color and luminous intensity the traffic light luminaire 20 comprises a control device 8 and a light detector 9 for detecting the homogenized light, in particular a photo diode. Thereby an optical feedback loop for the traffic light luminaire 20 is established. This feedback loop compensates for various effects influencing the light output color and luminous intensity. In the embodiment shown in FIG. 6 the homogenized light exiting the microstructured distributor 4 is detected. Therefore, the scattered light of the microstructured distributor 4 is guided to the light detector 9 by use of an optical supervision fiber 11 which is attached or positioned near to the microstructured distributor 4. It is also possible to detect light at the homogenizing device, the collimating device 2 or somewhere in between. This can be realised for example as presented in the European patent application with application number 12 172 424.9 (at this date unpublished).

Figure 7:
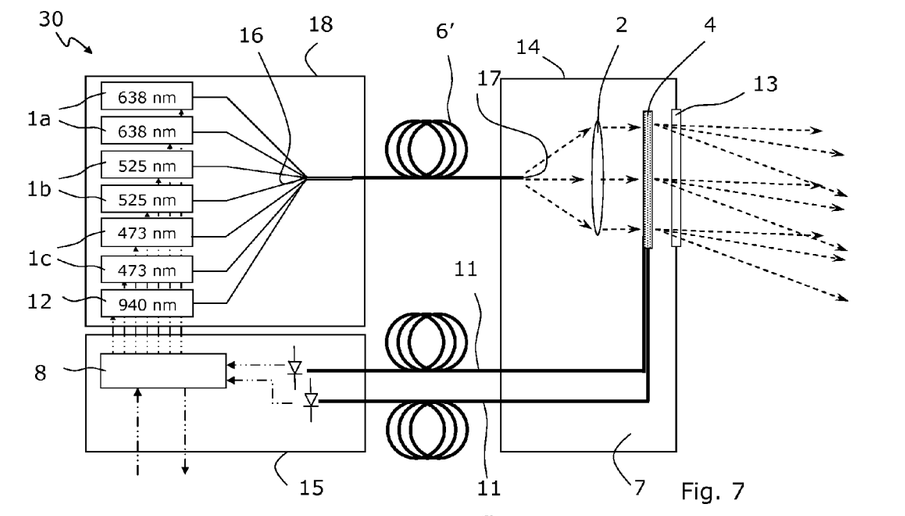
FIG. 7 shows an embodiment of a multicolor luminaire according to the invention.

A more advanced embodiment of the inventive luminaire 30 is shown in FIG. 7. The basic arrangement of light sources 1a, 1b, 1c, collection device 5, homogenizing device, collimating device 2 and microstructured distributor 4 is similar to that in FIG. 6. The luminaire 30 of FIG. 7 comprises light sources 1a, 1b, 1c of different colors, here: 638 nm (red), 525 nm (green) and 473 nm (blue), each color being represented twice for redundancy reasons. Additionally a further light source 12 is provided emitting IR-radiation (here: 940 nm). The light sources 1a, 1b, 1c, 12 are located in a source housing 18.

The IR-radiation is guided through the homogenizing waveguide 6, the collimation device 2 and the microstructured distributor 4 together with the visible radiation of the other light sources 1a, 1b, 1c. The IR-radiation distributed by the microstructured distributor 4 is absorbed by an IR absorbing window 13 (IR absorption coefficient preferably >90%), e.g. a protective window integrated into a housing 14 of the optical head 7. Due to the absorption of the IR radiation the optical head 7 can be heated to a certain amount. Therefore the surface of IR absorbing window 13 cannot grow damp with water or ice which increases the overall reliability of the luminaire 30 even under extreme environmental conditions (anti-frost function). Alternatively or in addition other components can be heated by the IR radiation, if the material is chosen accordingly (IR absorbing). The IR absorption coefficient of components which are not to be heated should be chosen low in order to allow transmission of the IR radiation.

Figure 8:
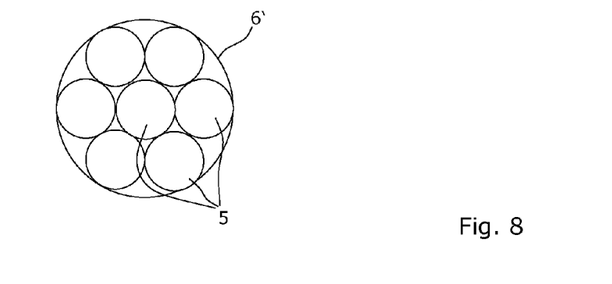
FIG. 8 shows a cross section of a transition of seven collecting fibers to one homogenizing fiber.

Each light source 1a, 1b, 1c, 12 is optically coupled to a collecting fiber 5. The collecting fibers 5 are bundled and inserted into a single homogenizing fiber 6' of the homogenizing device. FIG. 8 shows a cross section of the transition of the bundle of collecting fibers 5 and the single homogenizing fiber 6'. By providing light sources 1a, 1b, 1c of different colors, color mixing techniques can be applied. By adjusting the flux of the different light sources 1a, 1b, 1c the color of the light, which is to be spread by the luminaire 30 with a sharp luminous intensity distribution over an enlarged solid angle, can be chosen from a large range of colors different to the light color of the light sources 1a, 1b, 1c.

In the following, detailed data are presented for components used in the exemplary embodiment of the inventive luminaire shown in FIG. 7:

Table 1 shows characteristics of laser diodes which can be used as light sources 1a, 1b, 1c, 12 in an inventive luminaire 30:

TABLE 1

| LASER | Wavelength | Optical Power | Source Flux | Electrical Power |
|---|---|---|---|---|
| Red | 638 nm | 200 mW | 22 lm | 700 mW |
| Green | 520 nm | 55 mW | 26 lm | 1200 mW |
| Blue | 473 nm | 100 mW | 7.0 lm | 700 mW |
| IR | 940 nm | 2000 mW | — | 4800 mW |

With laser diodes according to table 1 the inventive luminaire 30 allows to address a large range of colors, especially within the green range.

Each light source 1a, 1b, 1c, 12 is butt-coupled into a 200 μm 0.48 NA multimode silica collecting fiber 5, i.e. there is no optics between the source and the fiber entrance. The fiber is disposed a few tens to a few hundred μm away from the source output. This is only efficient if the source is small compared to the fiber diameter and if the source divergence is small (and lower than the fiber angular acceptance). Typically for a 200 μm diameter fiber and for single mode solid state laser a distance of 100 μm between the fiber and the source gives a ±50 μm side tolerance. The bundle of seven collecting fibers 5 is then directly coupled into a single 600 μm 0.48 NA multimode silica homogenizing fiber 6' of 25 m length according to FIG. 8. Total coupling efficiency reaches 80%. Fiber losses due to propagation are reported in table 2.

TABLE 2

| | Wavelength | Silica Fiber attenuation | Silica Fiber Transmission |
|---|---|---|---|
| Red | 638 nm | 0.007 dB/m | 96% for 25 m |
| Green | 520 nm | 0.015 dB/m | 91% for 25 m |
| Blue | 473 nm | 0.024 dB/m | 87% for 25 m |
| IR | 940 nm | 0.006 dB/m | 96% for 25 m |

The output area of the homogenizing fiber 6' is positioned within the focal plane at the focal point of a 140 mm-diameter circular lens (collimating device 2) with a focal distance of 100 mm (0.57 NA). Considering, the fiber size (600 μm), the focal distance variation of the lens along the spectrum bandwidth (100 mm±1 mm between 480 nm and 650 nm) and the positioning tolerances of the fiber with respect to the focal plane of the lens (±1 mm) the output beam is collimated with a half-angle divergence δ smaller than 10 mRad (i.e. 0.6°). Due to interface losses and beam spillover, the collimation optical efficiency obtained is better than 83%. The microstructured distributor 4 is a 140 mm-diameter circular injection-moulded polymer structured distributor. It shapes a three-level flattop rectangular distribution diagram. Distribution properties are reported in table 3 for three different zones, a and 13 indicating respectively the two half apex angles of the rectangular pyramid delimiting each zone with respect to the signal pointing direction (i.e. the direction in which the beam propagates when no distributor is used.).

TABLE 3

| Distributed intensity | | Zone 1 20% | Zone 2 25% | Zone 3 55% |
|---|---|---|---|---|
| Vertical axis | α max | 1.0° | 1.0° | 1.0° |
| | α min | −30.0° | −4.0° | −1.5° |
| Horizontal axis | β max | 40.0° | 20.0° | 10.0° |
| | β min | −40.0° | −20.0° | −10.0° |

Two 600 μm-core-diameter 0.48 NA 25 m long supervision fibers 11 are side connected to the microstructured distributor 4 in order to couple back-scattered light from the microstructured distributor 4 to the photodiodes 9, which are placed in an electronic housing 15. The signals of the photodiodes 9 are used for optical supervision in order to ensure that the signal generated by the luminaire 30 is safely monitored in terms of chromaticity and intensity. By providing redundancy regarding the photodiodes 9 and the optical fibers 11 safety and reliability of the luminaire 30 is improved.

A 140 mm-diameter 2 mm-thick circular KG5 IR absorbing window 13 (absorbing more than 99.9% of the incident 940 nm light flux) is used at the output of the optical head 14. It constitutes a 1 W heat source (cf. table 4 for IR total throughput) and thus prevent from ice and/or condensation formation on the external side of the optical head 14.

TABLE 4

|  | IR 940 nm | Red 638 nm | Green 520 nm | Blue 473 nm |
|---|---|---|---|---|
| Fiber Coupling | 80% | 80% | 80% | 80% |
| Fiber propagation (25 m) | 96% | 96% | 91% | 87% |
| Optical collimation | 83% | 83% | 83% | 83% |
| Distributor | 80% | 80% | 80% | 80% |
| IR windows | 96% (first interface) | 70% | 88% | 88% |
| TOTAL Transmission | 49% | 35% | 42% | 40% |

The total optical throughput for each wavelength is indicated on table 4. This transmitted optical flux allows (amongst other) the generation of a 15 lm green signal (x=0.115 and y=0.520), 15 lm yellow signal (x=0.558 and y=0.440) or a 15 lm red signal (x=0.680 and y=0.315) with at least a 20% power margin on each light source and a total electrical power consumption lower than 2 W.

This 15 lm light flux is distributed with an optical intensity that depends on the user's angular position (cf. table 5) reaching up to 550 cd in the center of the field. When pointed with a ±1.0° degree accuracy with respect to the track, this signal provides a universal distribution pattern that match signal intensity requirements with almost all track configuration.

TABLE 5

|  | Angular sector | | |
|---|---|---|---|
|  | Zone 1 | Zone 2 | Zone 3 |
| Optical intensity | 5 cd | 85 cd | 550 cd |

The present invention takes advantage of a microstructured distributor associated with a high brightness well collimated versatile light source. This combination allows realization of a universal traffic light luminaire, i.e. a luminaire that can be used anywhere on a traffic network or in a lighting system. The inventive luminaire can be applied for generating light signals in a large variety of colors, sizes and shapes.

As can be seen from the exemplary embodiments, the differing wavelengths of light can be separated by about 300 nm, 100 nm or 50 nm. For example 940 nm−638 nm=302 nm; 638 nm−520 nm=118 nm; and 520 nm−473 nm=47 nm. It is understood that a varying degree of differing wavelengths can be used, i.e. different by generally 300 nm, 100 nm or 50 nm where each of the differing can vary by at least ±10 nm or at least ±10%.

Compared with a standard light-bulb signal, the inventive luminaire requires ten times less electrical power (when anti-frost function is not required) and exhibits longer lifetime than an incandescent bulb-light based luminaire.

LIST OF REFERENCE NUMBERS:

1, 1a-c high brightness light source
2 collimating device
3a-c directions of the distributed light
4 structured distributor
5 collecting waveguides
6 homogenizing waveguide
6' homogenizing fiber
7 optical head
8 control device
9 light detector
10 single source luminaire
11 supervision fiber
12 further light source
13 IR absorbing window
14 optical head housing
15 electronic housing
16 input area
17 output area
18 source housing
20 multiple source luminaire
30 multiple source luminaire
100 single source luminaire according to the state of the art
101 light source
102 collimation lens
103a-c directions
104 zoned distributor
105 zones of the zoned distributor
200 multiple source luminaire according to the state of the art
a optical axis
D diameter of the signal
f focal length of the collimating device
h diameter of the light source
S1-4 "virtual" macroscopic sections of the microstructured distributor
Z1-4 zones of the zoned distributor
α divergence of the light emitted by the light source
δ divergence of the collimated light

What is claimed is:

1. A traffic light luminaire, comprising:
at least two light sources:
an elongated light homogenizing device configured to spatially superimpose light emitted by the at least two light sources into a combined beam of superimposed light;
wherein the light homogenizing device comprises an optical waveguide including an input area feeding the light emitted by the at least two light sources into the optical waveguide and an output area emitting the beam of superimposed light;
a collimating device configured to collimate the beam of superimposed light emitting from the output area of the optical waveguide; and
a light distribution device for spreading the collimated light within a specific solid angle with a specific luminous intensity distribution;
wherein at least one of the at least two light sources is a high brightness light source;
wherein the light distribution device is a microstructured distributor having a microstructured surface, wherein each equal-sized macroscopic section of the microstructured distributor contributes to the luminous intensity distribution in the same way within said whole specified solid angle.

2. The traffic light luminaire according to claim 1, wherein at least one of the at least two light sources is a semiconductor light source.

3. The traffic light luminaire according to claim 1, wherein at least one of the at least two light sources is a laser diode or a high brightness LED.

4. The traffic light luminaire according to claim 1, wherein at least one of the at least two light sources comprises a size of the light source which is smaller than 2f tan δ, with f being the focal distance of the collimating device and 2δ being the smallest angular sector within which the intensity of the specified luminous intensity distribution is constant.

5. The traffic light luminaire according to claim 1, wherein the at least two light sources comprise at least two different types of light, each type emitting light of a different wavelength or color.

6. The traffic light luminaire according to claim 1, wherein the at least two light sources each emit a different wavelength of light.

7. The traffic light luminaire according to claim 1, wherein the shape of the waveguide is configured to reflect the superimposed beam of light at least two times.

8. The traffic light luminaire according to claim 1, wherein the optical waveguide comprises an optical fiber.

9. The traffic light luminaire according to claim 1, wherein the output area of the waveguide is positioned within or near a focal plane of the collimating device.

10. The traffic light luminaire according to claim 1, including an optical supervision system configured to control the intensity level of the light emitted by the at least two light sources, the supervision system comprising: an electronic control device controlling the output of the at least two light sources, the electronic control device receiving an input from at least one light detector, wherein the at least one light detector is configured to detect an emitted light sample from at least at one specific location within the traffic light luminaire, wherein the electronic control device is configured to simultaneously operate the light sources and to maintain a predetermined luminous intensity and color of the emitted light sample by controlling the output of the at least two light sources.

11. The traffic light luminaire according to claim 10, wherein the at least one light detector comprises a photo diode.

12. The traffic light luminaire according to claim 1, wherein the at least two light sources are placed within a source housing, and the collimating device with the microstructured distributor are placed in an optical head housing, wherein the source housing and the optical head housing are physically separated from each other while optically connected via the optical waveguide.

13. The traffic light luminaire according to claim 12, wherein the optical waveguide comprises an optical fiber.

14. The traffic light luminaire according to claim 1, including an IR light source, wherein the light homogenizing device spatially superimposes the light emitted by the at least two light sources along with an IR light emitted by the IR light source.

15. The traffic light luminaire according to claim 14, including an IR absorbing element disposed after the microstructured distributor, wherein the IR light emitted by the IR light source is configured to be absorbed by the IR absorbing element.

16. A traffic light luminaire, comprising:
   at least two light sources each emitting a different wavelength of light at least 50 nm apart, where the 50 nm is plus or minus 5 nm;
   a light homogenizing device configured to spatially superimpose the light emitted by the at least two light sources into a combined beam of superimposed light;
   the light homogenizing device comprising an optical fiber including an input area coupling the beam of superimposed light and an output area emitting the beam of superimposed light;
   a collimating device configured to collimate the beam of superimposed light emitting from the output area of the optical fiber;
   a light distribution device for spreading the collimated light within a specific solid angle with a specific luminous intensity distribution, wherein the light distribution device is a microstructured distributor having a microstructured surface, wherein each equal-sized macroscopic section of the microstructured distributor contributes to the luminous intensity distribution in the same way within the entirety of the specified solid angle; and
   wherein the at least two light sources with the light homogenizing device are placed within a source housing, and the collimating device with the microstructured distributor are placed in an optical head housing, wherein the source housing and the optical head housing are physically separated from each other while optically connected via the optical fiber.

17. The traffic light luminaire according to claim 16, including an optical supervision system configured to control the intensity level of the light emitted by the at least two light sources, the supervision system comprising: an electronic control device controlling the output of the at least two light sources, the electronic control device receiving an input from at least one light detector, wherein the at least one light detector is configured to detect an emitted light sample from at least at one specific location within the traffic light luminaire, wherein the electronic control device is configured to maintain a predetermined luminous intensity and color of the emitted light sample by controlling the output of the at least two light sources.

18. A traffic light luminaire, comprising:
   at least two light sources each emitting a different wavelength of light at least 50 nm apart, where the 50 nm is plus or minus 5 nm, and where each of the different wavelengths of light are within the visible spectrum;
   an infrared light source emitting an infrared wavelength of light;
   a light homogenizing device configured to spatially superimpose the light emitted by the at least two light sources and the infrared wavelength of light into a combined beam of superimposed light;
   the light homogenizing device comprising an optical fiber including an input area coupling the beam of superimposed light and an output area emitting the beam of superimposed light;
   a collimating device configured to collimate the beam of superimposed light emitting from the output area of the optical fiber; and
   a light distribution device for spreading the collimated light within a specific solid angle with a specific luminous intensity distribution, wherein the light distribution device is a microstructured distributor having a microstructured surface, wherein each equal-sized macroscopic section of the microstructured distributor contributes to the luminous intensity distribution in the same way within the entirety of the specified solid angle.

19. The traffic light luminaire according to claim 18, including an infrared absorbing element disposed after the microstructured distributor, wherein the infrared light emitted by the infrared light source is configured to be absorbed by the infrared absorbing element.

* * * * *